US007311319B1

(12) United States Patent
Ortega

(10) Patent No.: US 7,311,319 B1
(45) Date of Patent: Dec. 25, 2007

(54) THERAPEUTIC SCOOTER SYSTEM

(76) Inventor: Kathryn McDaniel Ortega, 801 Fairwood Forest Dr., Clearwater, FL (US) 33759

( * ) Notice: Subject to any disclaimer, the term of this patent is extended or adjusted under 35 U.S.C. 154(b) by 345 days.

(21) Appl. No.: 10/981,099

(22) Filed: Nov. 4, 2004

Related U.S. Application Data

(60) Provisional application No. 60/517,424, filed on Nov. 5, 2003.

(51) Int. Cl.
*B62B 7/04* (2006.01)

(52) U.S. Cl. .............................. 280/87.05; 280/87.021

(58) Field of Classification Search ........... 280/87.021, 280/87.01, 87.041, 87.05, 47.38
See application file for complete search history.

(56) References Cited

U.S. PATENT DOCUMENTS 4,065,145 A * 12/1977 Chambers .............. 280/87.021
5,120,074 A * 6/1992 Herman et al. ............. 280/220
5,158,313 A * 10/1992 Becker .................. 280/87.021
5,167,597 A * 12/1992 David ......................... 482/68
D363,904 S * 11/1995 Stone ........................ D12/130
5,702,326 A * 12/1997 Renteria ...................... 482/68
5,800,317 A * 9/1998 Accetta ....................... 482/66
5,839,740 A * 11/1998 Seeger .................. 280/87.021
6,149,170 A * 11/2000 Dotson .................. 280/87.021
6,161,860 A * 12/2000 Corneau ..................... 280/642
6,398,238 B1 * 6/2002 Shaw .................... 280/87.042
6,634,660 B2 * 10/2003 Miller ................... 280/87.021
6,808,188 B1 * 10/2004 Fan ....................... 280/87.041
6,848,696 B2 * 2/2005 Miller ................... 280/87.021
6,991,243 B2 * 1/2006 Boyle et al. ............. 280/87.05
D517,455 S * 3/2006 Allen et al. ................ D12/130

* cited by examiner

*Primary Examiner*—Jeff Restifo
(74) *Attorney, Agent, or Firm*—Edward P Dutkiewicz PA.

(57) ABSTRACT

A frame has a top portion and lower portions. A wheel assembly includes a front and a rear axle. The wheel assembly also includes a pair of front wheels and a pair of rear wheels. A steering assembly includes a lower tube. The lower tube is coupled to the front axle. The steering assembly includes an upper tube. The upper tube is adjustably received within the lower tube. A cross piece has handles. The handles are adapted to be held by a user for locomotion and for steering. A seat assembly has an upper planar support surface for a user.

3 Claims, 4 Drawing Sheets

FIG 3
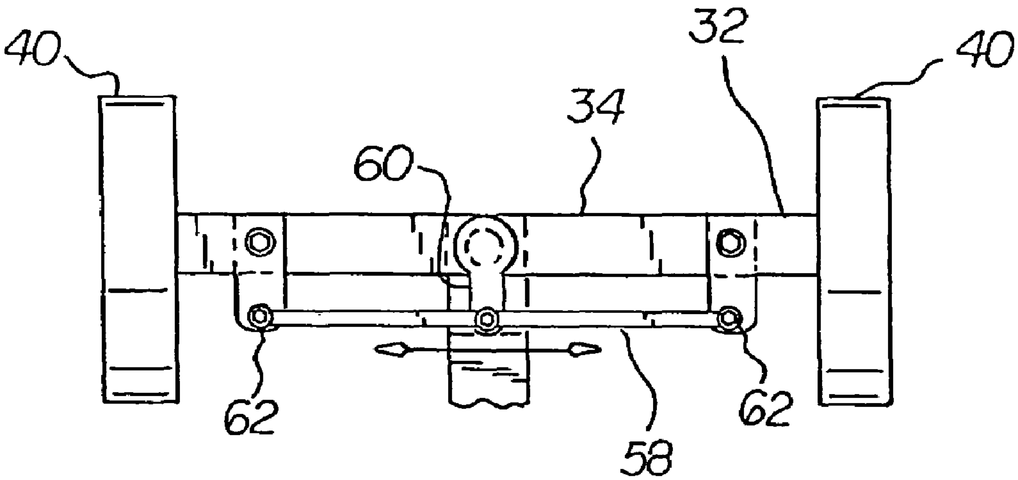
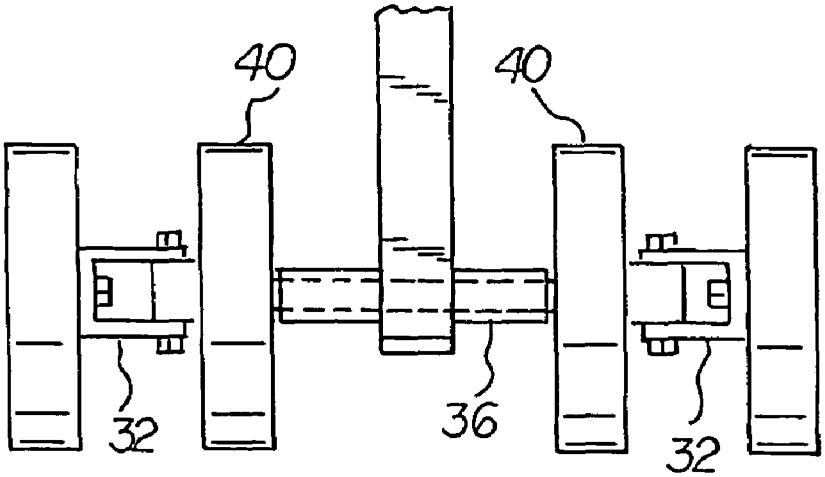
FIG 4

FIG 7
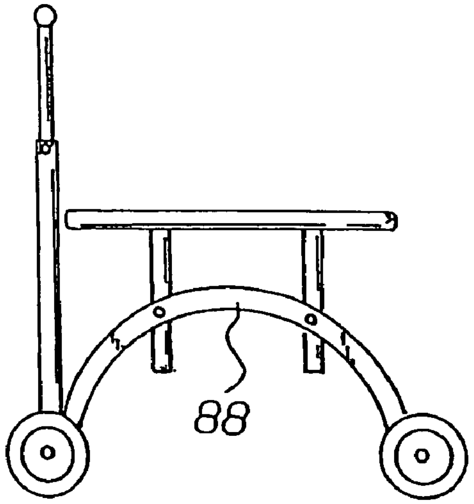
FIG 8
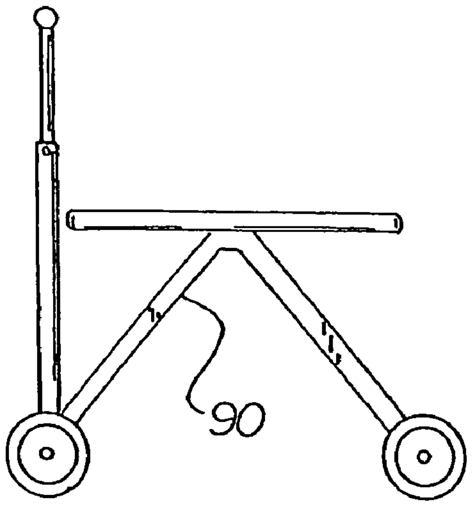
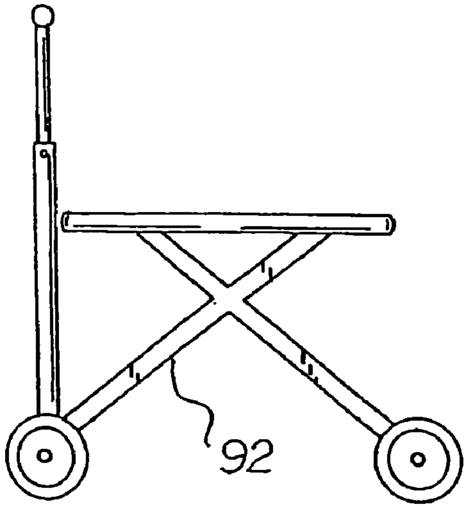
FIG 9
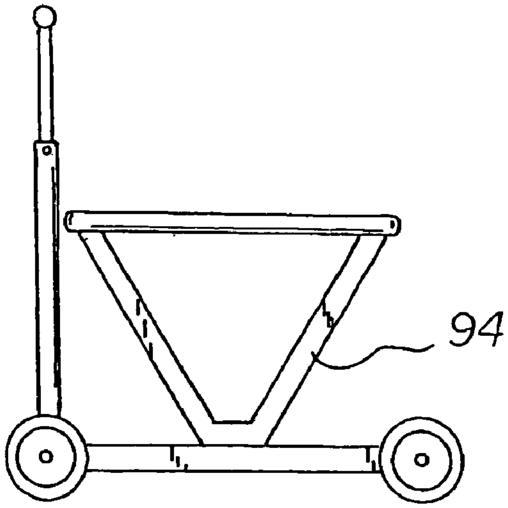
FIG 10

THERAPEUTIC SCOOTER SYSTEM

RELATED APPLICATION

The present application is based upon U.S. Provisional Patent Application Ser. No. 60/517,424 filed Nov. 5, 2003.

BACKGROUND OF THE INVENTION

1. Field of the Invention

The present invention relates to a therapeutic scooter system and more particularly pertains to providing support and mobility to an injured leg of a patient.

2. Description of the Prior Art

The use of scooter systems of known designs and configurations is known in the prior art. More specifically, scooter systems of known designs and configurations previously devised and utilized for the purpose of providing mobility to a user through known methods and apparatuses are known to consist basically of familiar, expected, and obvious structural configurations, notwithstanding the myriad of designs encompassed by the crowded prior art which has been developed for the fulfillment of countless objectives and requirements.

In this respect, the therapeutic scooter system according to the present invention substantially departs from the conventional concepts and designs of the prior art, and in doing so provides an apparatus primarily developed for the purpose of providing support and mobility to an injured leg of a patient.

Therefore, it can be appreciated that there exists a continuing need for a new and improved therapeutic scooter system which can be used for providing support and mobility to an injured leg of a patient. In this regard, the present invention substantially fulfills this need.

SUMMARY OF THE INVENTION

In view of the foregoing disadvantages inherent in the known types of scooter systems of known designs and configurations now present in the prior art, the present invention provides an improved therapeutic scooter system. As such, the general purpose of the present invention, which will be described subsequently in greater detail, is to provide a new and improved therapeutic scooter system and method which has all the advantages of the prior art and none of the disadvantages.

To attain this, the present invention essentially comprises a frame. The frame is fabricated of a rigid material, preferably metal. The frame has a top horizontal portion. The frame has a front and a rear. The frame has downwardly extending angled portions. The angled portions are in an essentially trapezoidal configuration. The angled portions terminate in a front lower end and a rear lower end. A forward extension portion is provided. The forward extension portion is formed as a continuation of the horizontal portion. The top horizontal portion has spaced apertures.

A wheel assembly is provided. The wheel assembly includes a front axle. The front axle has a central extent. The central extent is coupled to the front lower end of the frame. The wheel assembly includes a rear axle. The rear axle has a central extent. The central extent is coupled to the rear lower end of the frame. The front axle is between about 50 and 150 percent of the length of the rear axle. A pair of front wheels are included. The front wheels are rotatably coupled to the ends of the front axle. A pair of rear wheels are further included. The rear wheels are rotatably coupled to the ends of the rear axle. Each wheel has a diameter of about 6 inches.

Provided next is a steering assembly. The steering assembly includes a lower tube. The lower tube has an upper end and a lower end. The lower end is coupled to the front axle and extending upwardly from the front axle. The lower tube has a central extent. The central extent is rotatably received within the front part of the extension portion of the frame. The steering assembly also includes an upper tube. The upper tube has an upper end and a lower end. The lower end is adjustably received within the upper end of the lower tube. The upper end of the lower tube and the lower end of the upper tube have holes. A cooperable pin is provided. The pin is repositionable to allow a user to adjust the height of the upper tube. A cross piece is provided. The cross piece has handles. The handles are adapted to be held by a user for locomotion and for steering. The steering assembly also includes a tie rod. The tie rod has a central extent. The central extent has a connector. The connector is coupled to the lower end of the lower tube for rotation with the handles and upper tube and lower tube. The tie rod has ends. The ends have pivot pins for turning the front wheels in response to the rotation of the handles.

A seat assembly is provided next. The seat assembly includes an upper planar support surface for a user. The seat assembly includes vertical rods. The vertical rods extend downwardly from the support surface. The vertical rods are adjustably positioned within the apertures of the frame. The apertures and rods have holes. A pin is provided for locating the support surface at a height to accommodate a user. The height of the support surface is between about 14 and 21 inches.

Further provided is a hand brake assembly. The hand brake assembly has an upper end. The upper end is adapted to be controlled by a user. The hand brake assembly has a lower end. The lower end is operatively associated with a wheel to stop the system.

Provided last is a supplemental handle. The supplemental handle extends upwardly and rearwardly from the rear of the frame. In this manner a health care provider is allowed to push the system and a patient using the system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved therapeutic scooter system which has all of the advantages of the prior art scooter systems of known designs and configurations and none of the disadvantages.

It is another object of the present invention to provide a new and improved therapeutic scooter system which may be easily and efficiently manufactured and marketed.

It is further object of the present invention to provide a new and improved therapeutic scooter system which is of durable and reliable constructions.

An even further object of the present invention is to provide a new and improved therapeutic scooter system which is susceptible of a low cost of manufacture with regard to both materials and labor, and which accordingly is then susceptible of low prices of sale to the consuming public, thereby making such therapeutic scooter system economically available to the buying public.

Even still another object of the present invention is to provide a therapeutic scooter system for providing support and mobility to an injured leg of a patient.

Lastly, it is an object of the present invention to provide a new and improved scooter system. A frame has a top portion and downwardly extending portions. A wheel assembly includes a front and a rear axle. The wheel assembly also includes a pair of front wheels and a pair of rear wheels. A steering assembly includes a lower tube. The lower tube is coupled to the front axle. The steering assembly includes an upper tube. The upper tube is adjustably received within the lower tube. A cross piece has handles. The handles are adapted to be held by a user for locomotion and for steering. A seat assembly has an upper planar support surface for a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a bottom view of the front portion of the system taken along line 3-3 of FIG. 1.

FIG. 4 is a rear elevational view of the bottom portion of the system taken along line 4-4 of FIG. 1.

FIGS. 7 through 10 are side elevational views of alternate embodiments of the invention constructed with various frames.

The same reference numerals refer to the same parts throughout the various Figures.

DESCRIPTION OF THE PREFERRED EMBODIMENT

Figure 1:
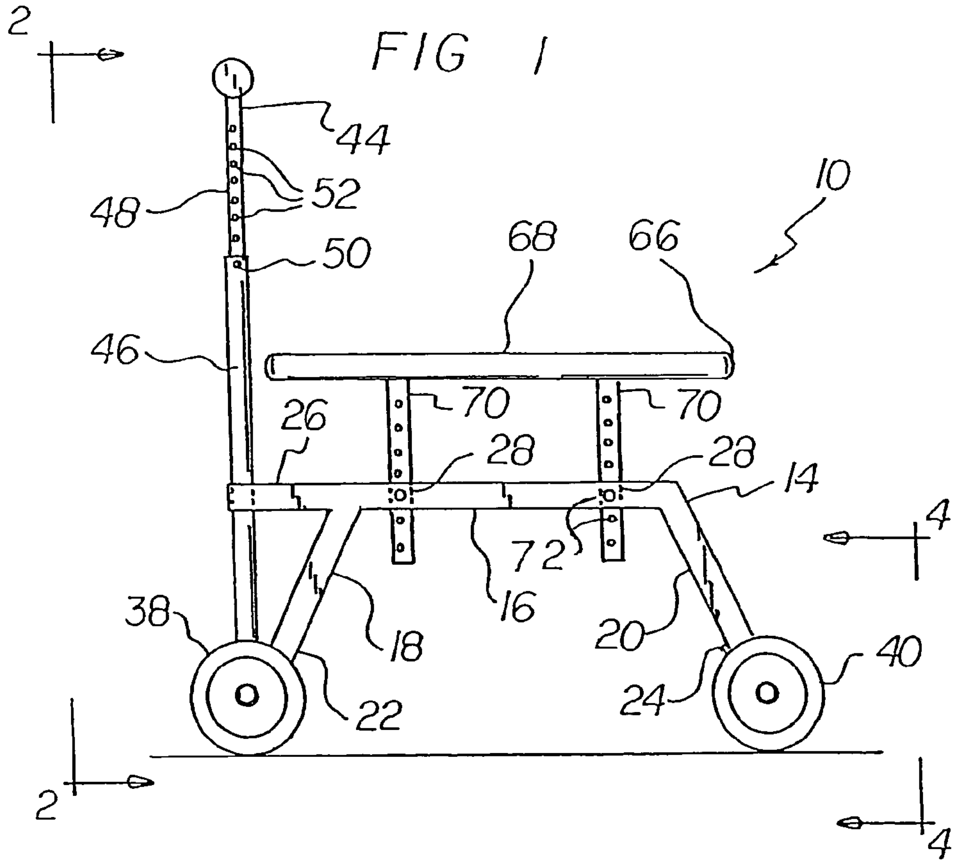
FIG. 1 is a side elevational view if a therapeutic scooter system constructed in accordance with the principles of the present invention.
Figure 2:
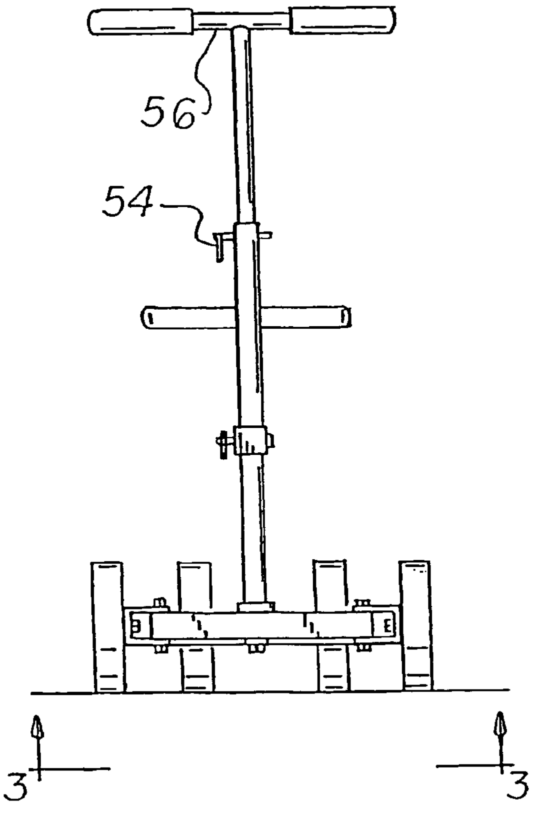
FIG. 2 is a front elevational view of the system taken along line 2-2 of FIG. 1.

With reference now to the drawings, and in particular to FIG. 1 thereof, the preferred embodiment of the new and improved therapeutic scooter system embodying the principles and concepts of the present invention and generally designated by the reference numeral 10 will be described.

The present invention, the therapeutic scooter system 10 is comprised of a plurality of components. Such components in their broadest context include a frame, a wheel assembly, a steering assembly, and a seat assembly. Such components are individually configured and correlated with respect to each other so as to attain the desired objective.

First provided is a frame 14. The frame is fabricated of a rigid material, preferably metal. The frame has a top horizontal portion 16. The frame has a front and a rear. The frame has downwardly extending angled portions 18, 20. The angled portions are in an essentially trapezoidal configuration. The angled portions terminate in a front lower end 22 and a rear lower end 24. A forward extension portion 26 is provided. The forward extension portion is formed as a continuation of the horizontal portion. The top horizontal portion has spaced apertures 28. Note is taken that the forward angled portion 18 is optional with the extension portion 26 formed as an extension of the horizontal portion 16. The forward angled portion may be utilized for added strength. Further, the rearward angled portion 20 and other portions may be angled as shown or they may be at any appropriate angle or arcuate as a function of the particular application.

A wheel assembly 32 is provided. The wheel assembly includes a front axle 34. The front axle has a central extent. The central extent is coupled to the front lower end of the frame. The wheel assembly includes a rear axle 36. The rear axle has a central extent. The central extent is coupled to the rear lower end of the frame. The front axle is between about 50 and 150 percent of the length of the rear axle. A pair of front wheels 38 are included. The front wheels are rotatably coupled to the ends of the front axle. A pair of rear wheels 40 are further included. The rear wheels are rotatably coupled to the ends of the rear axle. Each wheel has a diameter of about 6 inches. It should be realized that the various sizes and ratios as described herein, in the text and/or in the Figures, is for illustrative purposes only. A wide variety of sizes and ratios may me readily utilized as desired for the particular application of the user.

Provided next is a steering assembly 44. The steering assembly includes a lower tube 46. The lower tube has an upper end and a lower end. The lower end is coupled to the front axle and extending upwardly from the front axle. The lower tube has a central extent. The central extent is rotatably received within the front part of the extension portion of the frame. The steering assembly also includes an upper tube 48. The upper tube has an upper end and a lower end. The lower end is adjustably received within the upper end of the lower tube. The upper end of the lower tube and the lower end of the upper tube have holes 50, 52. A cooperable pin 54 is provided. The pin is repositionable to allow a user to adjust the height of the upper tube. Any of a wide variety of coupling mechanisms may readily be employed as a substitute for the holes and pin arrangement as shown herein, as for example quick release components. A cross piece 56 is provided. The cross piece has handles. The handles are adapted to be held by a user for locomotion and for steering.

The steering assembly also includes a tie rod 58. The tie rod has a central extent. The central extent has a connector 60. The connector is coupled to the lower end of the lower tube for rotation with the handles and upper tube and lower tube. The tie rod has ends. The ends have pivot pins 62 for turning the front wheels in response to the rotation of the handles. During operation and use, the central extent of the front axle 34 remains fixed with respect to the frame 14. Rotation of the handles and cross piece 56 by the user will rotate the connector 60 and the tie rod 58 and cause the rotation of the pivot pins 62. Such movement will also concurrently move the axes of rotation of the wheels at the ends of the front axle in one direction or the other to thereby control the direction of movement of the system.

A seat assembly 66 is provided next. The seat assembly includes an upper planar support surface 68 for a user. The seat assembly includes vertical rods 70. The vertical rods extend downwardly from the support surface. The vertical rods are adjustably positioned within the apertures of the frame. The apertures and rods have holes 72. A pin is provided for locating the support surface at a height to accommodate a user. As described above with respect to the height of the handles, any of a wide variety of coupling mechanisms may readily be employed as a substitute for the holes and pin arrangement for the support surface as shown herein, as for example quick release components. The height of the support surface for most adults when used for therapeutic purposes, is between about 14 and 21 inches. Such a range of heights may be greater or lesser depending on the person utilizing the system and the purpose of the system. It should be also appreciated that the system of the present invention is adapted to be utilized for any of a plurality of purposes, therapeutic purposes for a person with an injured leg who might otherwise use a crutch or crutches, or for transportation, or by a child for entertainment, etc.

Figure 5:
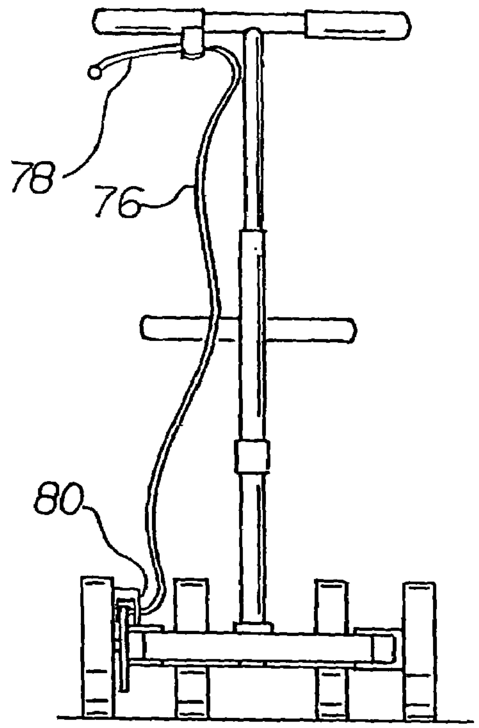
FIG. 5 is a front view of an alternate embodiment of the invention constructed with a brake.

Further provided is a hand brake assembly 76. Note the embodiment of FIG. 5. The hand brake assembly has an upper end 78. The upper end is adapted to be controlled by a user. The hand brake assembly has a lower end 80. The lower end is operatively associated with a wheel to stop the system.

Figure 6:
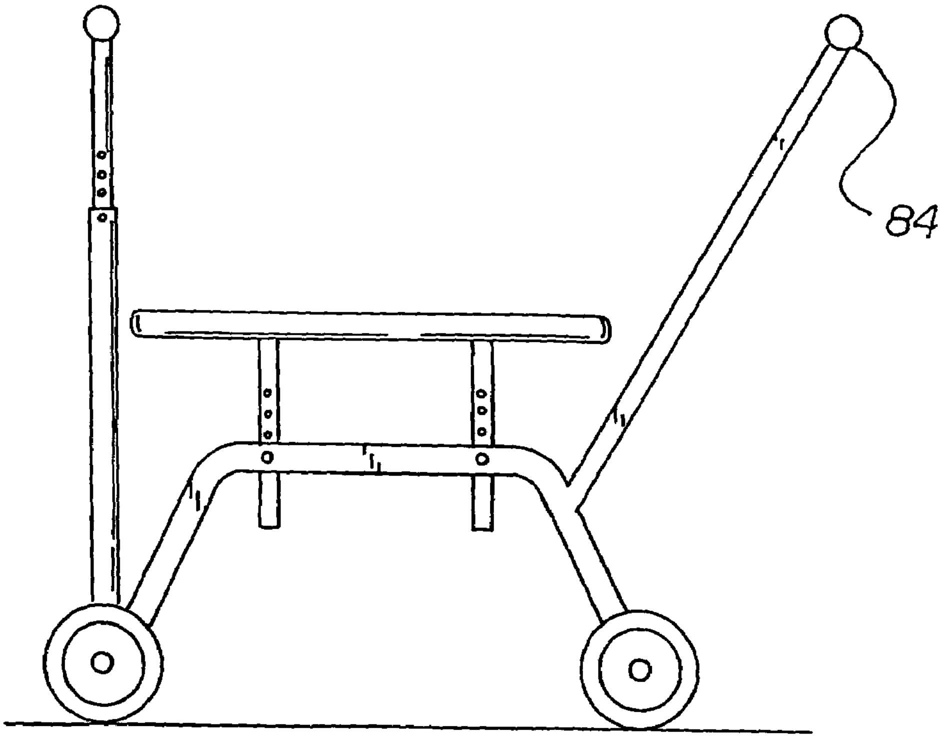
FIG. 6 is a front view of an alternate embodiment of the invention constructed with a push handle.

Provided last is a supplemental handle 84. Note the embodiment of FIG. 6. The supplemental handle extends upwardly and rearwardly from the rear of the frame. In this manner a health care provider is allowed to push the system and a patient using the system. For many applications the height of the supplemental handle is lower than shown in FIG. 6 so as to not interfere with the foot of a user. As in other aspects of the system, a wide variety of sizes and ratios may be utilized.

Additional alternate embodiments of the invention are illustrated in FIGS. 7 through 10. The FIG. 7 embodiment is a system with a frame 88 in an inverted U-shaped configuration. The FIG. 8 embodiment is a system with a frame 90 in an inverted V-shaped configuration. The FIG. 9 embodiment is a system with a frame 92 in an X-shaped configuration. The FIG. 10 embodiment is a system with a frame 94 in an V-shaped configuration.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A therapeutic scooter system for providing support and mobility to an injured leg of a patient comprising, in combination:

a frame fabricated of a rigid material with a top horizontal portion and a front and rear downwardly extending angled portions in an essentially trapezoidal configuration terminating in a front lower end and a rear lower end and a forward extension portion formed as a continuation of the horizontal portion, the top horizontal portion having spaced apertures;

a wheel assembly including a front axle having a central extent coupled to the front lower end of the frame and a rear axle having a central extent coupled to the rear lower end of the frame, the front axle being between about 50 and 150 percent of the length of the rear axle, a pair of front wheels rotatably coupled to the ends of the front axle and a pair of rear wheels rotatably coupled to the ends of the rear axle, each wheel having a diameter of about 6 inches;

a steering assembly including a lower tube having an upper end and a lower end coupled to the front axle and extending upwardly there from, the lower tube having a central extent rotatably received within the front part of the extension portion of the frame, the steering assembly also including an upper tube with an upper end and a lower end adjustably received within the upper end of the lower tube, the upper end of the lower tube and the lower end of the upper tube having holes and a cooperable pin repositionable to allow a user to adjust the height of the upper tube, a cross piece with handles adapted to be held by a user for locomotion and for steering, the steering assembly also including a tie rod with a central extent with a connector coupled to the lower end of the lower tube for rotation with the handles and upper tube and lower tube, the tie rod having ends with pivot pins for turning the front wheels in response to the rotation of the handles; and a seat assembly having an upper planar support surface for a user and two vertical rods extending downwardly from the support surface and adjustably positioned within the apertures of the frame, the apertures and rods having holes and pin for locating the support surface at a height to accommodate a user, the height of the support surface being between about 14 inches and 21 inches.

2. The system as set forth in claim 1 and further including:

a hand brake assembly having an upper end adapted to be controlled by a user and a lower end operatively associated with a wheel to stop the system.

3. The system as set forth in claim 1 and further including:

supplemental handle extending upwardly and rearwardly from the rear of the frame to allow a health care provider to push the system and a patient using the system.

* * * * *